(12) United States Patent
Robinson et al.

(10) Patent No.: US 12,062,216 B1
(45) Date of Patent: *Aug. 13, 2024

(54) CHASSIS FOR PRECISION OPTICAL DEVICES

(71) Applicant: Identification International, Inc., Blacksburg, VA (US)

(72) Inventors: Christopher Robinson, Christiansburg, VA (US); Richard Fenrich, Blacksburg, VA (US)

(73) Assignee: Identification International, Inc., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,117

(22) Filed: Aug. 14, 2023

Related U.S. Application Data

(63) Continuation of application No. 18/136,305, filed on Apr. 18, 2023, now Pat. No. 11,763,537.

(51) Int. Cl.
| | |
|---|---|
| *G06K 9/00* | (2022.01) |
| *G06F 3/041* | (2006.01) |
| *G06F 3/044* | (2006.01) |
| *G06V 10/141* | (2022.01) |
| *G06V 10/147* | (2022.01) |
| *G06V 40/13* | (2022.01) |

(52) U.S. Cl.
CPC ......... *G06V 10/147* (2022.01); *G06V 10/141* (2022.01); *G06V 40/1324* (2022.01)

(58) Field of Classification Search
CPC ..... G06V 40/1324; G02B 13/24; G02B 26/10
See application file for complete search history.

(56) References Cited

U.S. PATENT DOCUMENTS

| | | | | |
|---|---|---|---|---|
| 5,416,573 | A | 5/1995 | Sartor, Jr. | |
| 7,146,667 | B2 * | 12/2006 | Elsener | B25H 3/02 |
| | | | | 7/118 |
| 8,320,645 | B2 * | 11/2012 | Maase | G02B 13/24 |
| | | | | 382/126 |
| 11,763,537 | B1 * | 9/2023 | Robinson | G06V 40/1318 |
| 2002/0145042 | A1 * | 10/2002 | Knowles | G02B 26/10 |
| | | | | 235/462.01 |

\* cited by examiner

*Primary Examiner* — Michael J Vanchy, Jr.
(74) *Attorney, Agent, or Firm* — Sheppard Mullin Richter & Hampton LLP

(57) ABSTRACT

A fingerprint reader comprises a platen comprising a light-reflecting surface; a light source configured to emit light rays to illuminate a subject placed in contact with the light-reflecting surface of the platen; a camera configured to capture image data of the subject in contact with the light-reflecting surface of the platen; multiple optical elements arranged in an optical path between the platen and the camera; and an optical chassis comprising: multiple parallel raceway plates, the raceway plates fabricated from carbon fiber, and multiple crossmembers connecting pairs of the raceway plates, wherein the multiple optical elements are disposed in the multiple crossmembers.

18 Claims, 6 Drawing Sheets

CHASSIS FOR PRECISION OPTICAL DEVICES

CROSS-REFERENCE TO RELATED APPLICATIONS

This application is a continuation of U.S. patent application Ser. No. 18/136,305, filed Apr. 18, 2023, entitled "CHASSIS FOR PRECISION OPTIONAL DEVICES", which is hereby incorporated herein by reference in its entirety.

DESCRIPTION OF RELATED ART

The disclosed technology relates generally to optical devices, and more particularly some embodiments relate to fingerprint capture.

SUMMARY

In general, one aspect disclosed features a fingerprint reader, comprising: a platen comprising a light-reflecting surface; a light source configured to emit light rays to illuminate a subject placed in contact with the light-reflecting surface of the platen; a camera configured to capture image data of the subject in contact with the light-reflecting surface of the platen; multiple optical elements arranged in an optical path between the platen and the camera; and an optical chassis comprising: multiple parallel raceway plates, the raceway plates fabricated from carbon fiber, and multiple crossmembers connecting pairs of the raceway plates, wherein the multiple optical elements are disposed in the multiple crossmembers.

Embodiments of the fingerprint reader may include one or more of the following features. In some embodiments, the multiple raceway plates have a first coefficient of thermal expansion (CTE) along a first axis and a second CTE along a second axis, wherein the first CTE is less than the second CTE, and wherein the first axis is substantially parallel with the optical path. In some embodiments, the multiple crossmembers are fabricated from carbon fiber. In some embodiments, the multiple raceway plates define multiple raceways; and at least one of the raceway plates has a passage formed therein that allows light to move between the multiple raceways. In some embodiments, the multiple crossmembers are fabricated from plastic. In some embodiments, the multiple crossmembers are fabricated from metal. In some embodiments, the camera has a pixel density of 500 pixels per inch (ppi). In some embodiments, the camera has a pixel density of 1000 pixels per inch (ppi). In some embodiments, the multiple optical elements comprise: at least one lens; and at least one mirror.

In general, one aspect disclosed features a device comprising: an optical chassis comprising: multiple parallel raceway plates, the raceway plates fabricated from carbon fiber, and at least one crossmember connecting a pair of the raceway plates, the at least one crossmember configured to hold an optical element in an optical path.

Embodiments of the device may include one or more of the following features. In some embodiments, the multiple raceway plates have a first coefficient of thermal expansion (CTE) along a first axis and a second CTE along a second axis, wherein the first CTE is less than the second CTE, and wherein the first axis is substantially parallel with the optical path. In some embodiments, the at least one crossmember is fabricated from carbon fiber. In some embodiments, the multiple raceway plates define multiple raceways; and at least one of the raceway plates has a passage formed therein that allows light to move between the multiple raceways. In some embodiments, the at least one crossmember is fabricated from plastic. In some embodiments, the at least one crossmember is fabricated from metal. In some embodiments, a camera configured to capture light passed by the optical element. In some embodiments, the camera has a pixel density of 500 pixels per inch (ppi). In some embodiments, the camera has a pixel density of 1000 pixels per inch (ppi). Some embodiments comprise a light source. In some embodiments, the optical element comprises at least one of: a lens; and a mirror.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
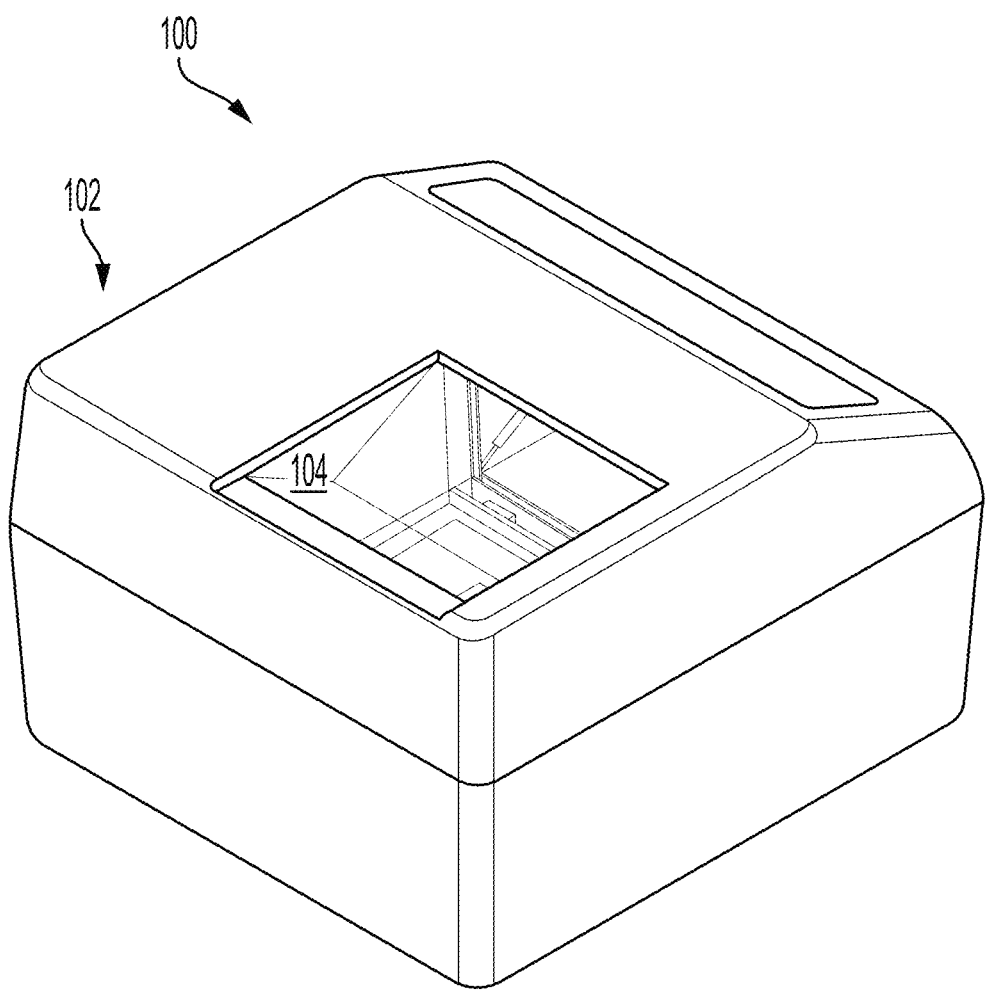
FIG. 1 illustrates a fingerprint reader according to some embodiments of the disclosed technology.

The figures are not exhaustive and do not limit the present disclosure to the precise form disclosed.

DETAILED DESCRIPTION

Building a high precision optical instrument requires a tightly controlled manufacturing process using carefully selected materials. Such systems often use objectives or lenses to focus electromagnetic radiation onto a capture sensor. If the optical path and/or optical components change from one use to the next the resulting images can be distorted away from the expected imagery. Conditions such as humidity, temperature, altitude, impacts, and other environmental and non-environmental conditions can affect the optical path and optical components in such a way. For example, a tenth of a millimeter difference in the optical path length or translations with respect to an optical axis can make a significant difference in optical system performance.

In such high precision optical instruments, optical chassis deficiencies can be caused by the composition of the chassis. For example, many plastics may not suit the needs for a high precision device for several reasons: the plastic could absorb water or chemicals to the point where the plastic is drastically deformed, or the chassis may expand or contract too much with temperature deviations thus causing unsuitable shifts of optical elements along the optical path. Alternatively, it may not be possible to use injection molding repeatably to make conformant plastic optical chassis due to inconsistent deformations caused in the plastic as it cools in the mold. Such deformations can be caused by wall thicknesses, support structures, injection points, plastic flow, mold heating and cooling, mold precision, and many other factors. Consequently, using plastic in high precision optical instrument chassis should be considered carefully in light of the use cases, support needs, and longevity of the desired device.

Using metals such as aluminum, steel, stainless steel, and cast iron may resolve some of the issues inherent with a plastic chassis. For example, it is easier to precisely locate optical elements if the metal chassis is formed and/or machined in a precision fashion. Acceptable parts could be cast using a cost-effective casting method and then milled on a high precision five axis mill. Such parts may meet the performance requirements required for a finished device, but the manufacturing process needs to be very carefully considered from a cost and throughput perspective. High precision milling machines are typically much more expensive than injection molding machines and their throughputs are much lower because feedstock needs to be fixtured for every part to be run. Contrast this to injection molding where the mold is placed only once and then molds millions of parts without mounting another mold.

If the metal part cost can be reduced to a suitable level, making a precision chassis out of metal could still be problematic if the coefficient of thermal expansion (CTE) of the metal is too high, the weight of the resulting chassis is too great, or the metal has poor oxidation characteristics. The CTE may need to be controlled even more tightly to obtain strict limits on how much the optical chassis can expand or contract due to temperature fluctuations.

The standard accepted forensic resolution for fingerprint scanning used for identification purposes against large databases has been 500 pixel per inch (ppi) for several years. The traditional approach to building a device to meet such rigorous requirements is using Frustrated Total Internal Reflection (FTIR) in conjunction with an optical prism, mirror(s), lens, and a camera. Newer technologies offer a modified approach to FTIR imaging, alternative approaches to optical imaging, or capacitance based systems.

Some fingerprint capture devices have been developed for 1000 ppi fingerprint and palm print imaging. While only doubling the resolution of these devices from 500 ppi, requirements driven by the use cases mean these 1000 ppi devices require manufacturing considerations for high precision optical instruments as discussed above. The demands in system design and manufacturing are significant. Material choice and manufacturing process are critical to the repeated ability to manufacture and use the device daily in a variety of environments. As newer fingerprint capture technologies are developed, much of the attention of these new developments is placed on improving the form factor of the device being used or on the cost reduction to give the end user less expensive and easier to handle or transport capture devices.

The disclosed technology addresses the issues described above in an integrated approach to fingerprint scanning for high resolution imagery. Notably, a scalable manufacturing approach is described for building an optical chassis for a high precision optical instrument. This approach is described for an example 1000 ppi fingerprint scanner. However, this approach may be applied to other high precision optical instruments as well, and to devices with lower resolution. Additionally, if the high precision optical instrument is a FTIR fingerprint scanner, this approach may be used to further reduce device size by folding the optical path, for example using mirrors. For example, a one-meter optical path can be reduced to less than 25 centimeters by folding the optical path multiple times and adding a new second track of the raceway neighboring the first track. In this configuration, the optical path can be guided to transit through the middle raceway plate to a mirror in the neighboring raceway. By using mirrors to fold the optical path in this manner, a designer has an advantage that they can cross the optical path numerous times, which enables an effective size reduction in the housing because the same internal area in the chassis can be reused multiple times as opposed to being used only once in an unfolded optical path.

This folding enables the device to incorporate known technologies such as Moisture Discriminating Optics (MDO) into a smaller device package. One approach to MDO is described in U.S. Pat. No. 5,416,573, the disclosure thereof incorporated by reference herein in its entirety. However, this approach requires design parameters that include a high index of refraction glass and a longer optical path length. Such strict requirements prevent the use of plastics or metals to form the optical chassis in a robust small and lightweight device. The described approaches using carbon fiber enable the manufacture of precision devices to incorporate MDO, for example as described below.

The disclosed technology enables production of a small format high precision optical device that is lightweight and high resolution (meaning 1000 ppi or greater), with the ability to handle water-like fluids in an FTIR configuration, and that may employ a single common interface cable connection to a host computer. In addition, the disclosed technology enables repeatable manufacturing that results in a robustness to operate in many different climates and environments without frequent recalibration.

In the disclosed embodiments, optical components may be mounted in a raceway type of structure in which raceway plates may be placed on either side of the optical path and optical elements may be mounted between the two plates using crossmembers that hold the optical elements. Thus, intervening lenses, windows, filters or other optical components may be mounted anywhere in the optical chain from the light source through to the lens and the camera.

In some embodiments, the raceway plates and/or the crossmembers in the raceway may be fabricated out of carbon fiber plates. Suitable carbon fiber stock is commercially available. The carbon fiber plates may be constructed to have little or no CTE. As the ambient temperature changes, the optical components remain in a fixed position with no movement with respect to one another. Thus, the optical system stays intact and the largest deviations in the optical path are introduced by changes in the optical components themselves as the temperature changes. In some embodiments, the plates may be fabricated to control CTE in one or more axes, for example including the longitudinal axis (along the length of the optical path), the height axis, and the width axis.

In some embodiments, the carbon fiber plates may be fabricated to control the CTE primarily in the longitudinal axis. For example if the optical path length is 1 meter but the required width and height of the optical path is only two inches then the CTE in the longitudinal direction may be controlled much more tightly than in the other two axes. That is, the longitudinal CTE is far more important to control on the optical path length. In such embodiments, other materials may be used for the cross members because the distortion in those axes may not exceed the tolerance required by the overall system. These other materials may include plastics, metals, and other suitable materials. For example, the materials may include a rigid, low CTE plastic with low water absorption. Such a construction may enable cost reduction as well as high performance.

Embodiments of the disclosed technology are described in terms of fingerprint scanners. However, it will be apparent to one skilled in the relevant arts that the disclosed technology may be applied to any high precision optical scanner. In particular, the disclosed technology may be beneficial to any optical path that may be sensitive to temperature deviations, water absorption, or other environmental factors.

FIG. 1 illustrates a fingerprint reader 100 according to some embodiments of the disclosed technology. The fingerprint reader 100 includes a housing 102 and a platen 104. The housing 102 may be fabricated from any suitable material.

Figure 2:
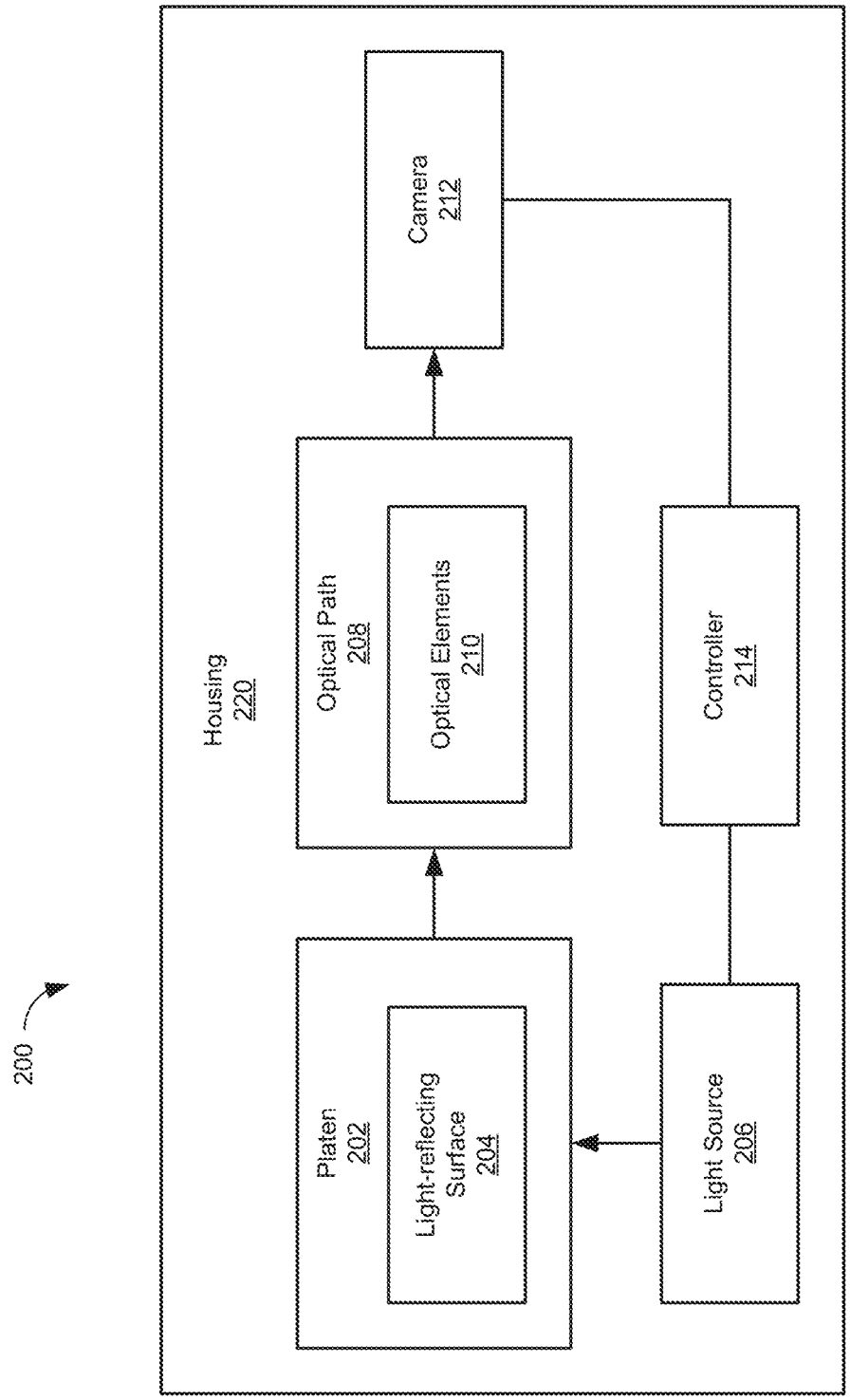
FIG. 2 is a block diagram of a fingerprint reader according to some embodiments of the disclosed technology.
Figure 3:
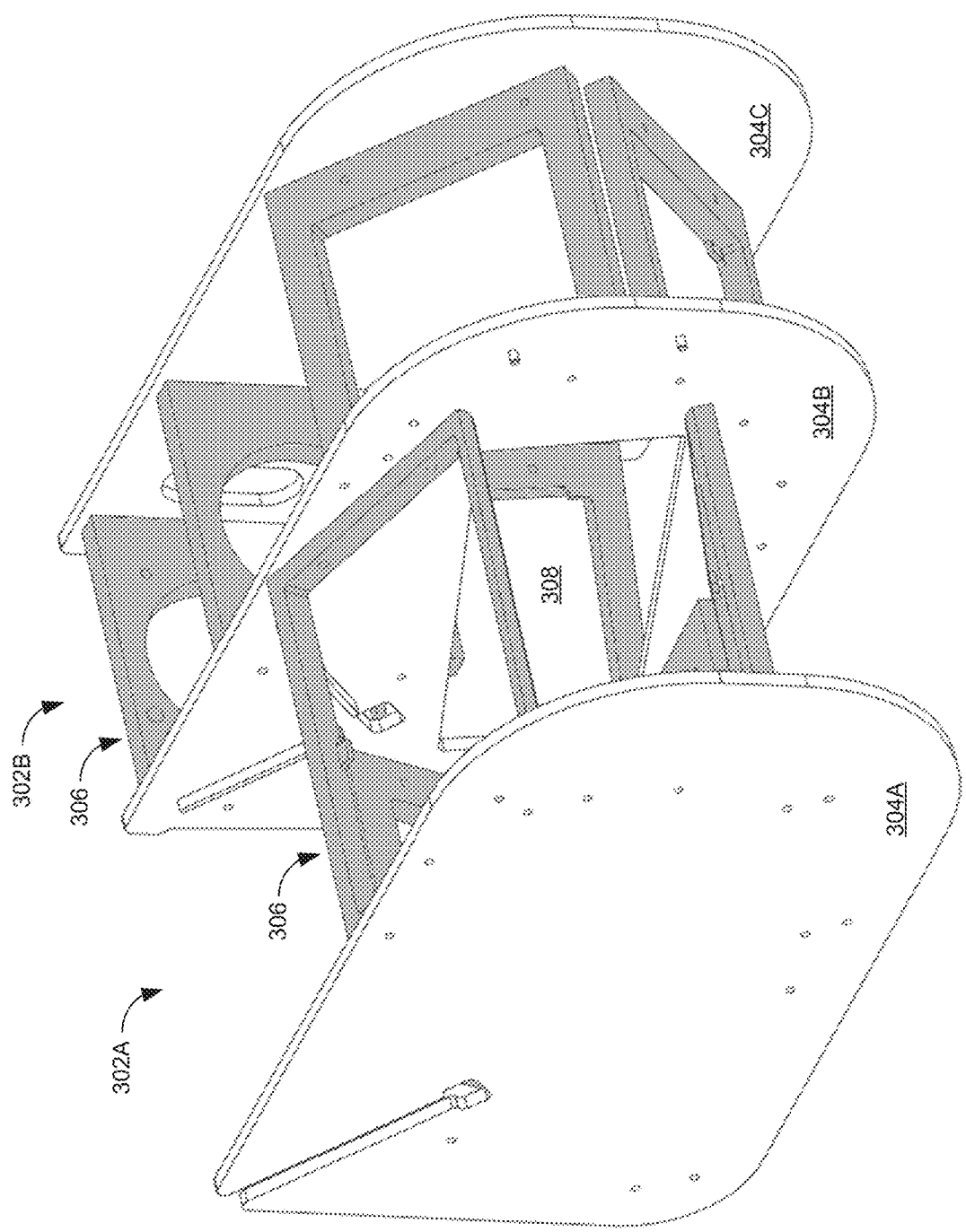
FIGS. 3-6 illustrate an optical chassis of a fingerprint reader according to some embodiments of the disclosed technology.
Figure 4:
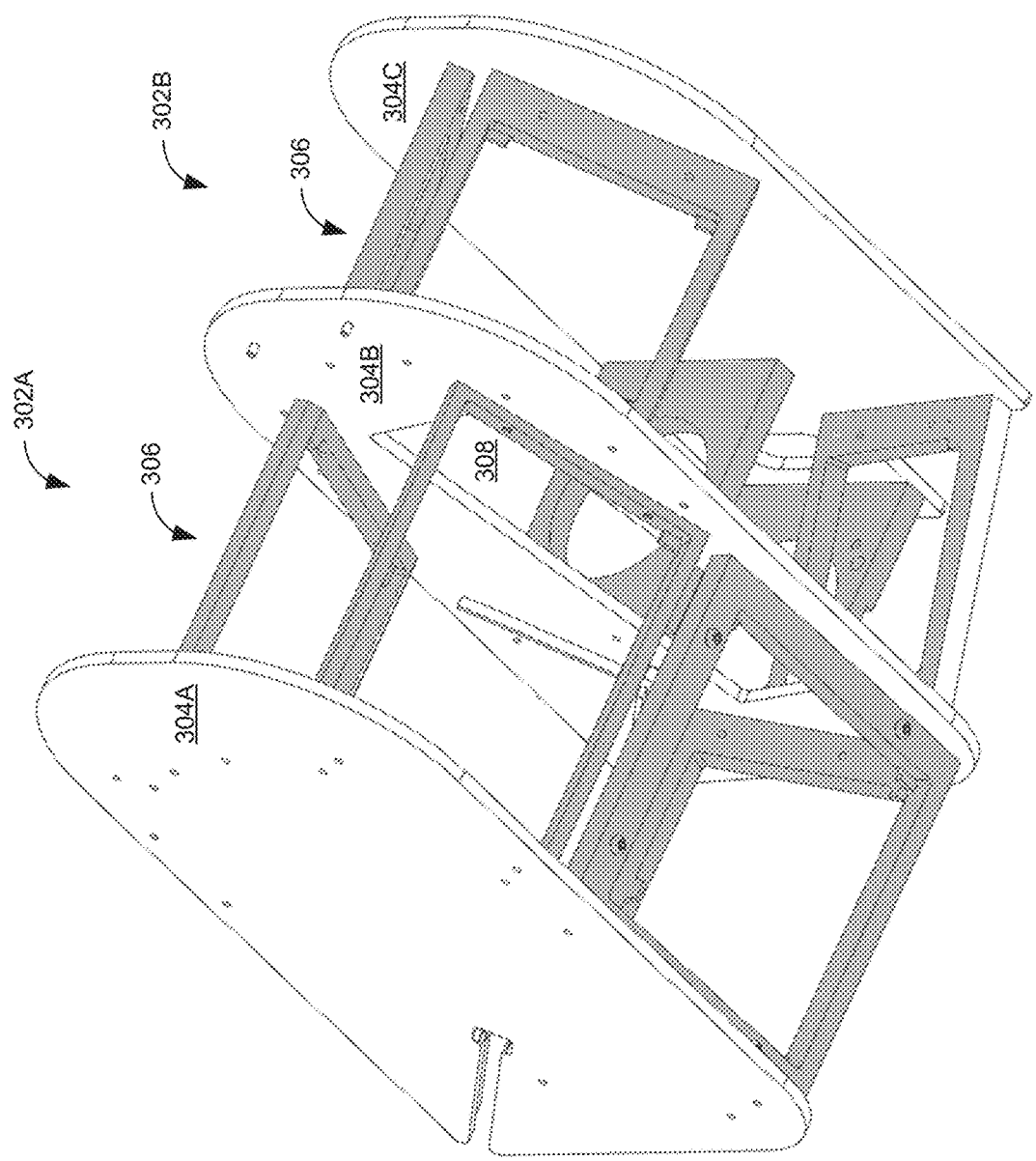
Figure 5:
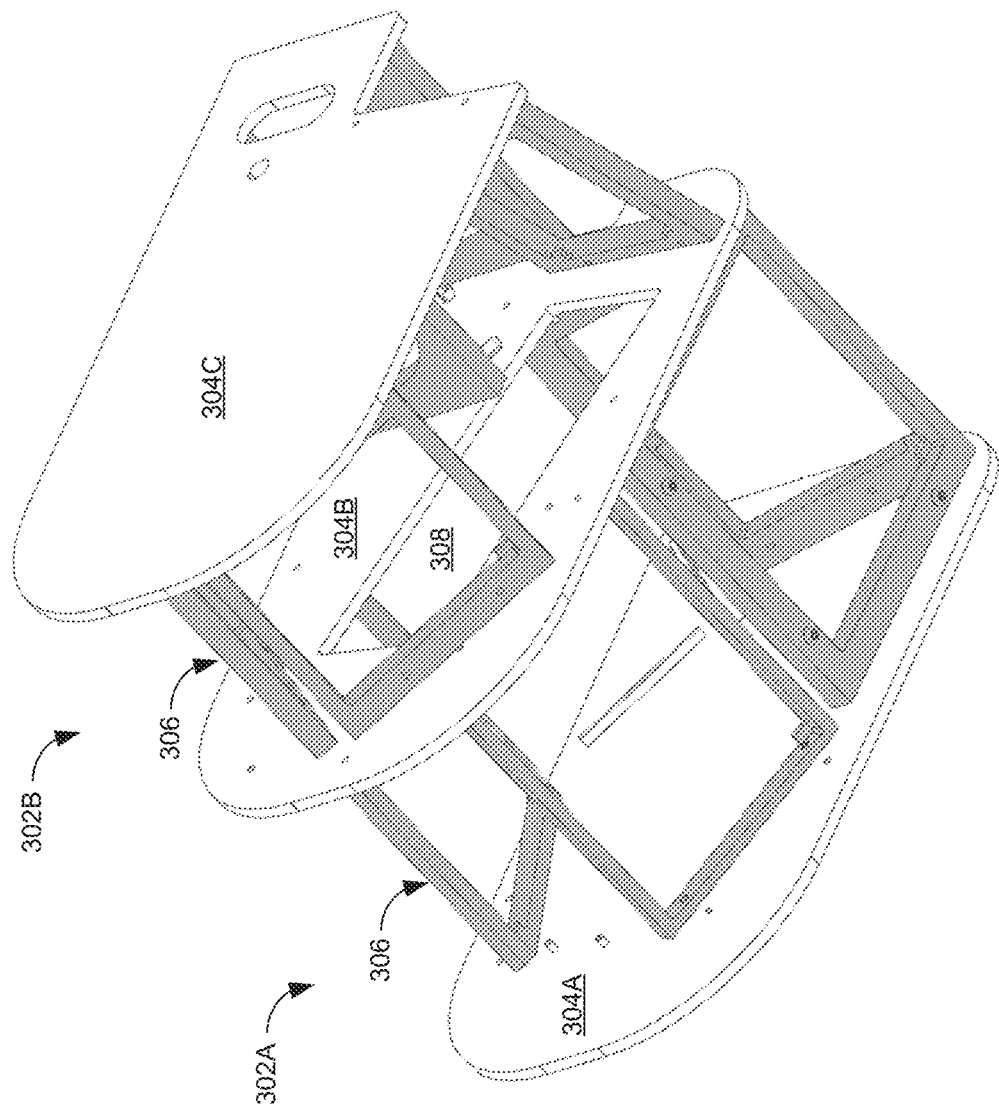
Figure 6:
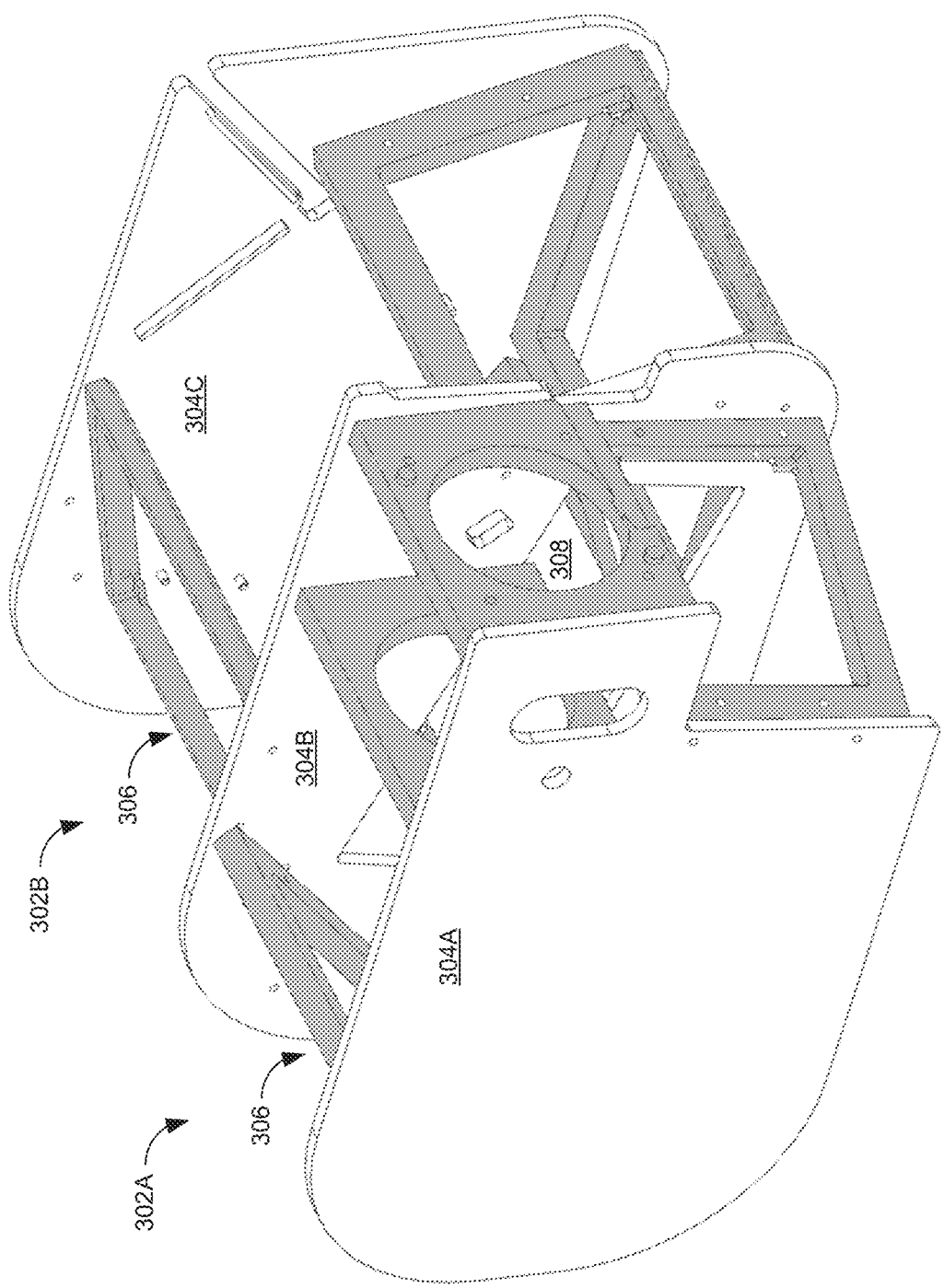

FIG. 2 is a block diagram of a fingerprint reader 200 according to some embodiments of the disclosed technology. The fingerprint reader 200 may include a platen 202, a light source 206, an optical path 208, a camera 212, a controller 214, and a housing 220. The platen 202 may include a light-reflecting surface 204. The light source 206 is configured to emit light rays to illuminate a subject placed in contact with the light-reflecting surface 204 of the platen 202.

The optical path 208 includes one or more optical elements 210. Light from the subject is passed by the optical elements 210 along the optical path 208, and is captured by the camera 212. The controller 214 may control the light source 206 and/or the camera 212. The platen 202, light source 206, optical path 208, camera 212, and controller 214 may be disposed within the housing 220. The housing 220 may be fabricated from plastic or another suitable material.

The camera 212 detects light having an axis of propagation which is at an angle relative to the surface normal of the platen 202. In embodiments that incorporate MDO, the camera 212 and platen 202 are arranged such that the angle is greater than the critical angle corresponding to an interface of the platen 202 and water, and less than the critical angle corresponding to an interface of the platen 202 and the finger being imaged. With this arrangement, incident light is internally reflected at the platen/water interface corresponding to the valleys of the finger being imaged, but not at the interface between the platen and the ridges of the finger being imaged. This enhances the contrast between the parts of the image formed by the ridge regions and the valley regions of the finger. Artifacts due to the presence of moisture on the finger, such as bridging between the finger ridges, are thus eliminated.

FIGS. 3-6 illustrate an optical chassis 300 of a fingerprint reader according to some embodiments of the disclosed technology. The optical chassis 300 may be disposed within a fingerprint reader such as the fingerprint reader 100 of FIG. 1. The depicted examples include two raceways 302A,B defined by three raceway plates 304A,B,C. However, other examples may include greater numbers of raceways, or only one raceway.

The optical chassis 300 also include multiple crossmembers 306 connecting the raceways. These crossmembers 306 may hold optical components, provide structural support, or both. The crossmembers 306 are shaded gray in the drawings.

If the optical path can be initially viewed as unfolded wherein the optical axis runs along a single vector from the object plane to the image plane, variations of this optical path may be constructed by folding the optical path in various ways. Often such folding involves inclusion of reflective, partially reflective, or refractive optics such as mirrors, prisms or beam splitters. These optical elements may be placed in the optical path in a position with respect to the object plane, optical axis, and image plane to redirect incident light in at least one changed direction.

In the disclosed embodiments, folding the optical path or building a device with multiple optical path segments may include placing these optical components in the crossmembers. These crossmembers may span the distance from one raceway plate to the next. This spanning feature not only adds strength to the chassis, but also conveniently provides a location to mount one or more optical components. In some embodiments, one or more optical components may be located by attaching the components to a raceway panel with mounting mechanisms that do not span two raceway panels therefore.

As an example, most of the crossmembers 306 in FIGS. 3-6 may hold front surface mirrors in a fixed position to redirect light traversing the optical path. In some embodiments, the mirrors maintain fixed positions with respect to the optical path. Some embodiments include adjustment mechanisms built into one or more of the crossmembers 306 to allow for adjustment of the optical path during assembly of the device to meet optical configuration requirements. An adjustment mechanism may be any mechanism that changes the location and/or orientation of an optical component being held by a crossmember 306 or other mount.

Depending on the extent to which the optical path is folded, the optical path may traverse multiple raceways in the optical chassis. In the example of FIGS. 3-6, the optical chassis 300 includes multiple raceways 302, with a passage 308 formed in the central raceway plate 304B that allows light to move between the raceways 302 as directed by mirrors mounted in crossmembers 306.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A fingerprint reader, comprising:
   a platen comprising a light-reflecting surface;
   a light source configured to emit light rays to illuminate a subject placed in contact with the light-reflecting surface of the platen;
   a sensor configured to capture image data of the subject in contact with the light-reflecting surface of the platen;
   at least one optical element arranged in an optical path between the platen and the sensor; and
   an optical chassis comprising:
      multiple parallel raceway plates, the raceway plates fabricated from a low-CTE (coefficient of thermal expansion) material, and
      multiple crossmembers connecting at least one pair of the raceway plates; and
      wherein the at least one optical element is disposed in one of the multiple crossmembers.

2. The fingerprint reader of claim 1, wherein the low-CTE material is at least one of:
   carbon fiber;
   cast iron; or
   other metals.

3. The fingerprint reader of claim 1, wherein:
   the at least one optical element is attached to one of the raceway plates.

4. The fingerprint reader of claim 1, wherein:
   the multiple raceway plates have a first CTE along a first axis and a second CTE along a second axis, wherein the first CTE is less than the second CTE, and wherein the first axis is substantially parallel with the optical path.

5. The fingerprint reader of claim 1, wherein at least one of the multiple crossmembers is fabricated from at least one of:
   carbon fiber;
   plastic; or
   metal.

6. The fingerprint reader of claim 1, wherein:
   the sensor and the platen are positioned relative to one another so that the sensor detects light having an axis of propagation which is at an angle relative to a surface normal of the platen, wherein the angle is greater than the critical angle corresponding to an interface of the platen and water, and less than the critical angle corresponding to an interface of the platen and the subject.

7. The fingerprint reader of claim 1, wherein:
   the multiple raceway plates define multiple raceways; and
   at least one of the raceway plates has a passage formed therein that allows light to move between at least two of the multiple raceways.

8. The fingerprint reader of claim 1, wherein fingerprint reader has a pixel density of:
   500 pixels per inch (ppi); or
   1000 ppi.

9. The fingerprint reader of claim 1, wherein the at least one optical element comprises at least one of:
   a lens; and
   a mirror.

10. A device comprising:
    a platen comprising a light-reflecting surface;
    a light source configured to emit light rays to illuminate a subject placed in contact with the light-reflecting surface of the platen;
    a sensor configured to capture image data of the subject in contact with the light-reflecting surface of the platen; and
    at least one optical element arranged in an optical path between the platen and the sensor;
    an optical chassis comprising:
       multiple parallel raceway plates, the raceway plates fabricated from a low-CTE (coefficient of thermal expansion) material, and
       at least one crossmember connecting a pair of the raceway plates; and
    wherein the at least one optical element is disposed in the at least one crossmember.

11. The device of claim 10, wherein the low-CTE material is at least one of:
    carbon fiber;
    cast iron; or
    other metals.

12. The device of claim 10, wherein: the at least one optical element is attached to one of the raceway plates.

13. The device of claim 10, wherein:
    the multiple raceway plates have a first coefficient of thermal expansion (CTE) along a first axis and a second CTE along a second axis, wherein the first CTE is less than the second CTE, and wherein the first axis is substantially parallel with the optical path.

14. The device of claim 10, wherein the at least one crossmember is fabricated from at least one of:
    carbon fiber;
    plastic; or
    metal.

15. The device of claim 10, wherein:
    the multiple raceway plates define multiple raceways; and
    at least one of the raceway plates has a passage formed therein that allows light to move between the multiple raceways.

16. The device of claim 10, wherein the device has a pixel density of:
    500 pixels per inch (ppi); or
    1000 ppi.

17. The device of claim 10, further comprising:
    a light source.

18. The device of claim 10, wherein the optical element comprises at least one of:
    a lens; or
    a mirror.

* * * * *